United States Patent
Watchorn et al.

[15] 3,642,488
[45] Feb. 15, 1972

[54] PROTEIN SUPPLEMENTS FOR RUMINANT FEEDING STUFFS

[72] Inventors: Noel Watchorn, Norton-on-Tees; Arthur William James Broome, Macclesfield, both of England

[73] Assignee: Imperial Chemical Industries Limited, London, England

[22] Filed: Mar. 14, 1968

[21] Appl. No.: 767,482

[30] Foreign Application Priority Data

Nov. 14, 1967 England..............................51,780/67

[52] U.S. Cl. ..............................................................99/2
[51] Int. Cl. .........................................................A23k 1/22
[58] Field of Search..........................99/2, 2 N; 71/27, 29; 260/256.4, 555 R, 555 A, 555 B, 555 C

[56] References Cited

UNITED STATES PATENTS

| | | | |
|---|---|---|---|
| 2,687,354 | 8/1954 | Gribbins | 99/2 |
| 3,322,528 | 5/1967 | Hamamoto | 71/29 |
| 3,219,432 | 11/1965 | Schafer et al. | 71/28 |

OTHER PUBLICATIONS

Chem. Abstracts, Vol. 66, 1967 94230N-Hamamoto, M.

*Primary Examiner*—Norman Yudkoff
*Assistant Examiner*—Kenweth VanWyck
*Attorney*—Cushman, Darby & Cushman

[57] ABSTRACT

A ruminant feedstuff comprising, as a supplementary source of nitrogen, at least one alkylidene diurea, in particular isobutylidene diurea and crotonylidene diurea; said alkylidene diurea may be admixed with at least one conventional feedstuff.

2 Claims, No Drawings

PROTEIN SUPPLEMENTS FOR RUMINANT FEEDING STUFFS

This invention relates to new sources of protein to supplement the feeding of ruminantia, and to nonprotein nitrogenous feeding stuffs comprising compounds (and compositions containing such compounds) which assist the microflora and microfauna of such animals to produce protein.

The importance of protein in the nutrition of ruminants has long been recognized. Nitrogen-containing substances such as urea which can be converted to ammonia in the rumen can, in theory, be substituted for natural protein in the diet of ruminants when natural protein is in short supply, for example under drought conditions, or expensive in terms of nitrogen. The utility of such substances as protein supplements for ruminants is restricted to some extent since the rate of ammonia-nitrogen release from the substance in the rumen is not geared to the rate at which the ammonia can be utilized for the synthesis of protein by the rumen micro-organisms. When the rate of ammonia release is too great, for example with urea, the excess ammonia can prove toxic to the ruminant. Urea must therefore be fed to ruminants under carefully controlled conditions. When the rate of ammonia release is too slow, for example with urea formaldehyde, nonprotein nitrogen leaves the rumen unchanged and is wasted.

For many years, urea has been used in conjunction with other feeding stuffs such as oilseed meals, as a protein supplement for ruminants. However in view of the innate limitations of urea as a protein supplement, much research has been carried out to find alternative sources of nonprotein nitrogen.

We have now found that a very suitable and useful class of compounds for this purpose are alkylidene diureas having the formula I:

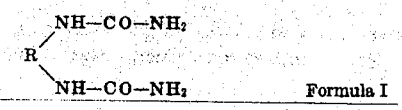

Formula I or the formula II:

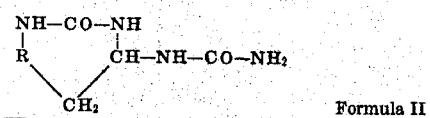

Formula II wherein R is a substituted or unsubstituted alkylidene group having two to six carbon atoms.

A typical, and preferred, compound according to formula I is isobutylidene diurea (I.B.D.U.):

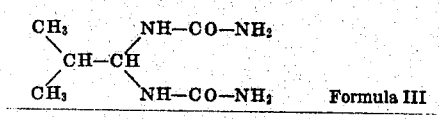

Formula III and a typical compound according to formula II is crotonylidene diurea (4-ureido-6-methyl-perhydropyrimidin-2-one):

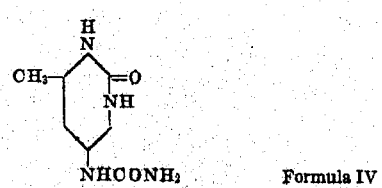

Formula IV

Compounds according to formulas I and II are only slightly soluble and we have confirmed, by qualitative analysis, that they are slowly hydrolyzed by the rumen fluids into urea and aldehydes containing two to six carbon atoms (isobutyraldehyde in the case of isobutylidene diurea, and acetaldehyde or crotonaldehyde in the case of crotonylidene diurea), the rate of hydrolysis being sufficiently slow that the amount of urea present at any one moment, as a result of such hydrolysis, is sufficiently small so as to be readily converted to ammonia by the microflora and microfauna, such ammonia being in turn readily converted to protein. The urea is thus released at a rate which ensures that it is used as efficiently as possible and that it is never present in such quantities as to be toxic.

Indeed, we have found that compounds of formula I and formula II, in particular isobutylidene diurea, are neither acutely nor cumulatively toxic to ruminants, and that they form a useful and effective source of nonprotein nitrogen for ruminants such as sheep. The lack of toxicity is due to the slow rate of hydrolysis by the bacteria. Thus it is possible to achieve nitrogen retention levels which exceed the demand for maintenance if the compounds of formula I and formula II are used as a supplementary source of nitrogen in protein-deficient diets. Furthermore, although the urea resulting from the hydrolysis of the compounds does not contribute to the energy of the diet, the aldehydes simultaneously released (in particular isobutyraldehyde) do so.

The compounds of formula I or formula II may be fed to the animals as such, or they may be mixed with carbohydrates, proteins, minerals, or other conventional feedstuffs.

The present invention accordingly provides a ruminant feedstuff comprising, as a supplementary source of protein, one or alkylidene diureas of formula I or formula II.

The present invention further provides a ruminant feed composition comprising one or more conventional feedstuffs and, as a supplementary source of nitrogen other than protein, one or more alkylidene diureas of formula I or formula II.

The invention further provides a method of supplementing the diet of ruminants by feeding thereto, as a supplementary source of nitrogen other than protein, one or more alkylidene diureas of formula I or formula II.

As stated hereinabove, the preferred compound is isobutylidene diurea.

EXPERIMENT I—LAMB GROWTH TRIALS

The merit of various nonprotein nitrogen products was first assessed by means of a growth trial involving 30 young lambs. These were allocated to four different treatment groups so that each contained three male and three female lambs with similar mean live body weights and the same distribution of weight range. Each treatment group was further subdivided into three replicates of two animals which were allocated to individual feeding pens in a random block fashion.

The composition of the various experimental rations is shown in table 1; they were formulated according to the A.R.C. feeding standards so that 1 kg. diet would contain sufficient energy and protein for a daily live weight gain of approximately 200 g./lamb. Vegetable protein (from maize) in the basal diet was sufficient for 75 percent of the total protein requirement on a total crude protein basis but only 50 percent on the basis of digestible crude protein. It was therefore calculated that at least 25 percent of the lamb's protein needs would have to be met from the supplementary nitrogen sources.

The various concentrate rations were fed at a rate of 1 kg./head/day divided into three meals. Barley straw (C.P. = 4.6 percent) was fed ad lib and the animals were bedded on sawdust. Prior to the commencement of feeding the experimental diets, all lambs received an anthelmintic treatment ('Nilverm') and 10,000 I.U. Vitamin A by intramuscular injection. One month later they each received a further 10,000 I.U. Vitamin A and were vaccinated against Pasteurella (some coughing became apparent).

Live body weights were recorded weekly and food refusals daily.

RESULTS AND DISCUSSION

The effect of the various diets on lamb performance is summarized in table 2.

TABLE 1. COMPOSITION OF EXPERIMENTAL LAMB DIETS (1ST GROWTH TRIAL)

| Diet | Source of Supplementary nitrogen | Crude protein in basal ration | Crude protein* of supplement | Total crude protein — Calculated | Total crude protein — Analysis | Metabolizable* energy (cals./lb.) |
|---|---|---|---|---|---|---|
| 1 | None | 6.36 | | 6.36 | 6.1 | 1,320 |
| 2 | Soya bean meal | 6.28 | 6.62 | 12.9 | 11.9 | 1,320 |
| 3 | Urea formaldehyde | 6.26 | 6.67 | 12.93 | 13.5 | 1,320 |
| 4 | I.B.D.U. | 6.24 | 6.67 | 12.91 | 11.9 | 1,320 |

*Calculated

All diets supplemented with the necessary minerals (including sulphur) and vitamins.

TABLE 2.—EFFECT OF DIFFERENT SOURCES OF SUPPLEMENTARY NITROGEN ON LAMP GROWTH

| Diet | Supplementary nitrogen source | Mean initial lamb weight (lbs.) | Mean week weight (lbs.) | Gain (lbs.) weeks 0–4 | Percent controls (2) | Mean 8 week weight (lbs.) | Gain (lbs.) weeks 4–8 | Percent controls (2) | Gain (lbs.) weeks 0–8 | Percent controls (2) |
|---|---|---|---|---|---|---|---|---|---|---|
| 1 | None | 34.8 | 36.8 | 2.0 | 14.2 | (*) | | | | |
| 2 | Soya bean meal | 35.1 | 49.3 | 14.1 | 100 | 60.8 | 11.6 | 100 | 25.7 | 100 |
| 3 | Urea formaldehyde | 35.0 | 41.3 | 6.3 | 44.8 | 41.1 | −0.2 | | 6.1 | 23.8 |
| 4 | I.B.D.U. | 36.1 | 44.6 | 8.5 | 60.5 | 53.9 | 9.3 | 80 | 17.8 | 69.2 |

*Negative control lambs became weak and had to be removed from trial.
6 lambs/treatment.

The lambs receiving diet 1 (containing no supplementary nitrogen) ate poorly, gained very little weight, and eventually became so weak that they had to be removed from the experiment. This is taken to indicate that the basic diet was indeed deficient in protein and that any growth response obtained with other diets should represent utilization of supplementary nitrogen.

Comparison of lamb performance from 0–4 weeks and 4–8 weeks indicates a possible adaptive response to I.B.D.U. None of these effects reach a statistically significant level, suggesting that on this type of diet, which is very low in the natural protein, 'adaption' to all the products is probably quite rapid.

Further experiments were carried out, concerned with a further examination of the "adaption" period likely to be associated with the use of I.B.D.U., from which it emerged that I.B.D.U. does not suffer from the need for acclimatization as would have been expected from the results of the previous lamb growth trial.

EXPERIMENT II—TOXICITY a. Chronic Toxicity

All the nonprotein-nitrogen compounds examined were free from toxic effects and palatability problems in the two feeding trials. Where food intake was affected (i.e., with urea formaldehyde) this appeared to result as a secondary effect from protein deficiency.

b. Acute Toxicity

Experiments with I.B.D.U. have shown that 50 g. are tolerated by sheep with no apparent ill effects.

EXPERIMENT III—NITROGEN BALANCE

To avoid any confusion as to the source of nitrogen being utilized, it was decided that these experiments should be conducted on completely synthetic diets in which the products under study formed the only nitrogen source. Accordingly, diets composed of starch (60 percent), glucose 30 percent and 10 percent of a mineral, vitamin, nitrogen supplement were formulated to give a concentrate containing approximately 8 percent crude protein. 750 g. of these concentrates were supplemented with 150 g. chopped barley straw (4.6 percent C.P.) to form the daily ration for 60-lb. wether lambs in standard nitrogen balance experiments.

A latin square experimental design was used to examine the value of the various nitrogen supplements, using six replicates of six sheep for each nitrogen source. The animals were allowed 10 days to acclimatize to each diet before commencing a 6-day balance experiment. The mean nitrogen retentions per sheep over the 6-day experimental period are listed below:

| Source of Nitrogen in diet | Mean grams nitrogen retention/ sheep/6 days |
|---|---|
| Fishmeal | +4.42 |
| Urea | −4.80 |
| Isobutylidene diurea | +5.74 |

The data indicate a significant advantage to fishmeal, and I.B.D.U., compared to urea.

We claim:

1. A method of supplementing the diet of ruminants which comprises feeding isobutylidene diurea to the ruminants, as a supplementary source of nitrogen other than protein.

2. The method of claim 1, wherein the isobutylidene diurea is fed in admixture with a ruminant feedstuff.

* * * * *

PO-1050
(5/69)

UNITED STATES PATENT OFFICE
CERTIFICATE OF CORRECTION

Patent No. 3,642,488                         Dated February 15, 1972

Inventor(s)  Noel Watchorn and Arthur William James Broome

It is certified that error appears in the above-identified patent and that said Letters Patent are hereby corrected as shown below:

In the heading opposite "Filed" the date "March 14, 1968" should read --October 14, 1968--.

Signed and sealed this 29th day of August 1972.

(SEAL)
Attest:

EDWARD M. FLETCHER, JR.                    ROBERT GOTTSCHALK
Attesting Officer                          Commissioner of Patents